United States Patent [19]

Kontz

[11] Patent Number: 4,743,153

[45] Date of Patent: May 10, 1988

[54] METHOD AND APPARATUS FOR STACKING ARTICLES

[75] Inventor: Robert F. Kontz, Toledo, Ohio

[73] Assignee: Owens-Illinois Plastic Products Inc., Toledo, Ohio

[21] Appl. No.: 901,846

[22] Filed: Aug. 29, 1986

[51] Int. Cl.[4] .................. B65G 57/30

[52] U.S. Cl. .................. 414/31; 414/52; 414/96; 414/786

[58] Field of Search .................. 414/31, 32, 52, 95, 414/96, 786; 271/212

[56] References Cited

U.S. PATENT DOCUMENTS

| | | | |
|---|---|---|---|
| 2,744,369 | 5/1956 | Seragnoli | 414/95 X |
| 3,037,645 | 6/1962 | Simpkins | 414/95 X |
| 3,330,425 | 7/1967 | Reda | 414/96 X |
| 3,659,695 | 5/1972 | Reese | 414/96 X |
| 3,895,574 | 7/1975 | Nyborg | 414/96 X |
| 4,092,685 | 5/1978 | Sander et al. | 414/96 X |
| 4,377,111 | 3/1983 | Kincheloe et al. | 414/96 X |

FOREIGN PATENT DOCUMENTS

| | | | |
|---|---|---|---|
| 73387 | 3/1958 | France | 414/32 |

*Primary Examiner*—Leslie J. Paperner

[57] ABSTRACT

A method of and apparatus for stacking articles which is used in the embodiment herein to stack plastic carriers for holding a plurality of filled containers, wherein each carrier has a top panel and a skirt extending downwardly therefrom. Articles are successively moved into a prestacking position and then elevated into a lifting rack. The rack is reciprocated up a guideway, for receiving a plurality of the articles and maintaining them in a stacked relationship, to a stack support means and then back down to receive more articles from the pre-stacking position. The guideway is preferably provided with an open side for removal of a stack of articles, and is tilted away from the open side to retain the articles therein by gravity. To enable smoother transfer of articles from the pre-stacking position to the lifting rack, the articles are inclined at the pre-stacking position to an angle which is perpendicular to the inclined guideway and elevated into the rack.

21 Claims, 13 Drawing Sheets

METHOD AND APPARATUS FOR STACKING ARTICLES

BACKGROUND OF THE INVENTION

1. Field of the Invention

This invention generally relates to a method of and apparatus for stacking articles and, in the embodiment disclosed herein, more particularly to the stacking of articles which may be relatively flimsy and difficult to handle because of a tendency toward dimensional instability.

2. Description of the Prior Art

There are many novel features in this invention, and in my two copending applications Ser. No. 901,670, filed Aug. 29, 1986 and Ser. No. 901,671, filed Aug. 29, 1986, that are applicable to the general art of label formation, label application, and stacking of the labeled articles. However, the overall combination of features in the embodiment disclosed in these three applications is particularly useful in solving the unique problems in handling, adhesive application, label formation and application, restacking, etc. of plastic carriers. These carriers have a top panel with a skirt extending downwardly with surface areas on the skirt for receiving labels. The top panel and skirt have relatively thin walls which, although semi-rigid when retaining a full load of filled containers, are somewhat flimsy and the carriers are dimensionally unstable in comparison with beverage containers, cans, boxes and other fairly rigid packages receiving labels.

In the prior art there are disclosures in U.S. Pat. Nos. 3,954,542; 4,108,706; 4,108,710; and 4,181,555 relating to feeding labels while U.S. Pat. No. 3,779,829 shows label application to opposite sides of an article. U.S. Pat. Nos. 3,915,448; 3,919,040; and 4,323,029 illustrate cam mechanisms for performing various timed machine operations. U.S. Pat. Nos. 3,883,385 and 4,079,875 show label cutters and severing mechanisms. U.S. Pat. No. 4,089,725 illustrates indexing while U.S. Pat. No. 4,124,429 is illustrative of the use of photo elements for control purposes. However none of these patents discloses the combination of mechanisms and functions necessary to solve the unique problems encountered in dealing with articles such as the plastic carriers discussed above. This is not surprising since plastic carriers with surface areas for receiving labels have just recently become available.

With respect to methods and apparatus for stacking, the prior art that appears to be the most relevant is found in U.S. Pat. Nos. 3,037,645; 3,659,695 and 3,895,477. However, neither the unique method and apparatus of the present invention nor the functions performed are found in those disclosures.

SUMMARY OF THE INVENTION

The method and apparatus for performing the method of stacking articles includes an upright guideway for receiving a plurality of articles and maintaining them in a stacked relationship. Support means are disposed on the periphery of the guideway for engaging an article in the guideway to support the article, as well as other articles stacked thereon, and further includes means permitting passage of articles upwardly past the support means through said guideway but preventing passage of articles downwardly past the support means.

Lifting rack means are provided having article engaging means disposed below the support means on the periphery of the guideway for lifting one or more articles from above an initial entry position in the guideway to a level at which the lowermost article in the lifting rack is engaged by the above-described support means. Articles previously engaged by the support means are pushed upwardly in the guideway and combined with articles received from the lifting rack in a stack in the guideway. Means are also provided for successively elevating articles into article engaging position in the lifting rack.

The support means preferably includes means having a first surface beginning inside an area defined by the largest perimeter of an article being stacked and extending downwardly and outwardly to terminate outside of the perimeter, thereby guiding the articles into the support means. The support means may further include a second catch surface formed integral with and above said first surface to engage an article below the largest perimeter. The first and second surfaces may be pivotably mounted to enable the surfaces to be pushed outwardly by a perimeter of an article moving up the guideway. The pivoted first and second surfaces may be yieldingly urged toward a perimeter of the article. The function of the first and second surfaces may be performed by pawl means mounted on the guideway.

The lifting rack is movable up the guideway in response to the receipt of a predetermined number of articles in the rack to deposit the articles on the support means. Alternatively, the lifting rack may be periodically reciprocated up to the support means to deposit thereon articles accumulated in the rack, and back down to an article receipt level. The lifting rack may include pawl means to receive and engage articles from the elevating means.

The lifting rack means may include slide rod means secured to the guideway and bracket means slidably mounted on the slide rods. Fluid cylinder means has a ram shaft which is operable to reciprocate the bracket up and down on the slide rods.

The elevating means may include an elevator plate pivotably mounted to successively raise articles into the lifting rack. The guideway advantageously has an open side for removal of a stack of articles therefrom, with the guideway being tilted in a direction opposite to the open side thereof in order to insure that a stack of articles will be retained within the guideway by gravity. In this instance, the elevating plate may be pivotably mounted to reciprocate between a horizontal article receiving position and an article transfer position at the lifting rack which is perpendicular to the tilted guideway. Generically, the elevating means may be described as including means for receiving an article in a position oblique to the guideway and for inclining the article to an angle which is perpendicular to the guideway while raising the article into the lifting rack.

The method of this invention includes the steps of successively moving articles into a pre-stacking position, successively elevating each article into a lifting rack until a predetermined number of such articles have accumulated in the rack, and reciprocating the lift rack up the guideway to deposit articles accumulated thereon on stack support means in the guideway and back to the position for successively receiving elevated articles. Previously deposited articles are pushed upwardly in the guideway.

The object of this invention, therefore, is to provide an improved method of and apparatus for stacking articles.

It is a further object of this invention to provide a unique method and apparatus for stacking articles which are relatively flimsy and have a tendency to be dimensionally unstable, such as plastic carriers for containers.

Other objects, advantages and features of this invention will become more apparent during the course of the following description when read in conjunction with the accompanying drawings.

BRIEF DESCRIPTION OF THE DRAWINGS

In the drawings, where like numerals are employed to designate like parts throughout

DESCRIPTION OF THE PREFERRED EMBODIMENT

Figure 1:
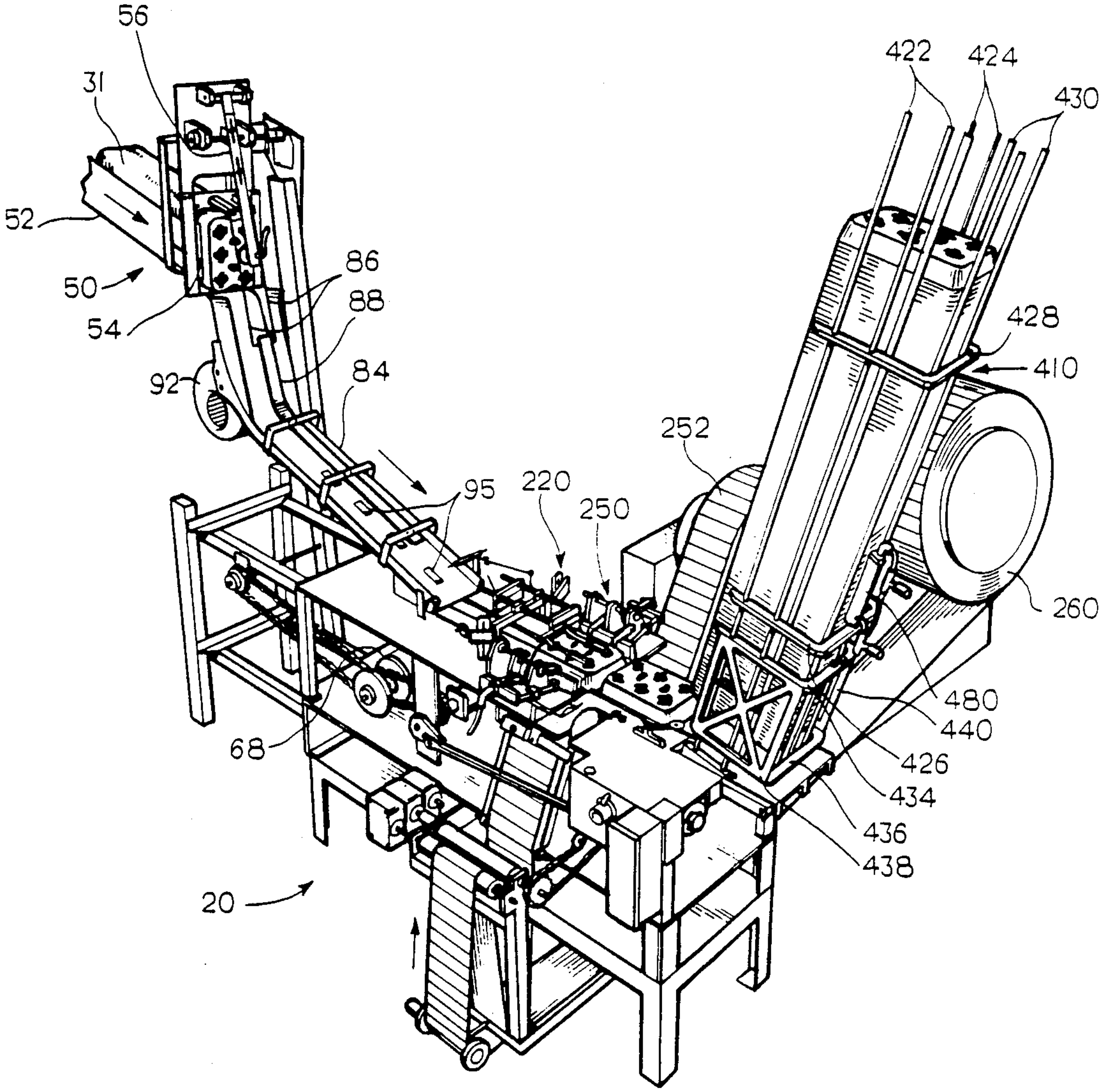
FIG. 1 is a view in perspective of label application apparatus embodying the teachings of this invention.

Referring now to FIG. 1 there is illustrated label application apparatus indicated generally at 20 in which a stack of plastic carriers 31 have individual carriers removed therefrom by a carrier feeding means indicated generally at 50. A carrier supply chute 52 retains the stack 31, with the stack being urged forwardly by gravity, spring mechanisms or other suitable means. The end or top of the stack is held in position by opposed sets of bristles, brushes or other suitable means 54 which yieldingly engage lips or edges 39 of the carriers 31.

Figure 2:
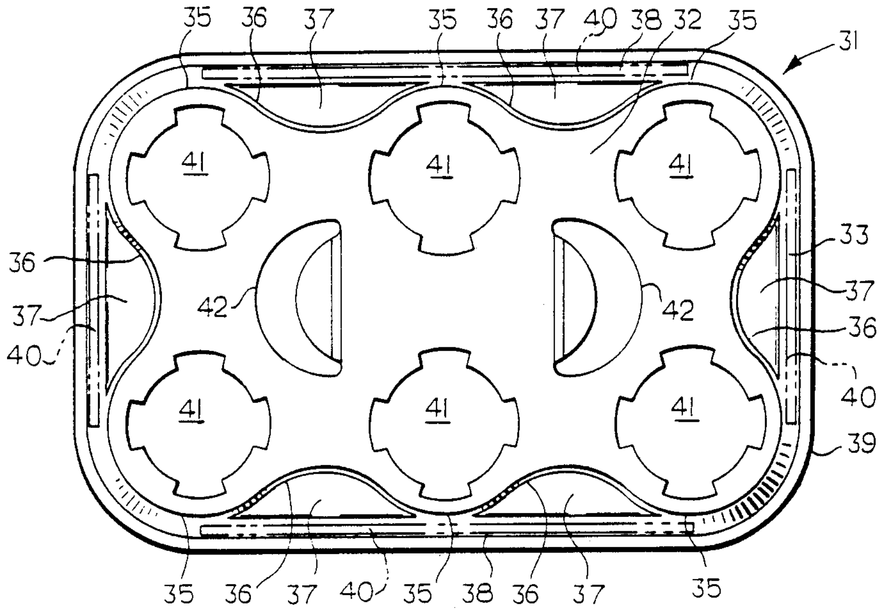
FIGS. 2, 3 and 4 are top plan, front elevational, and side elevational views, respectively, of a plastic carrier to which labels are to be applied according to the teachings of this invention.
Figure 3:
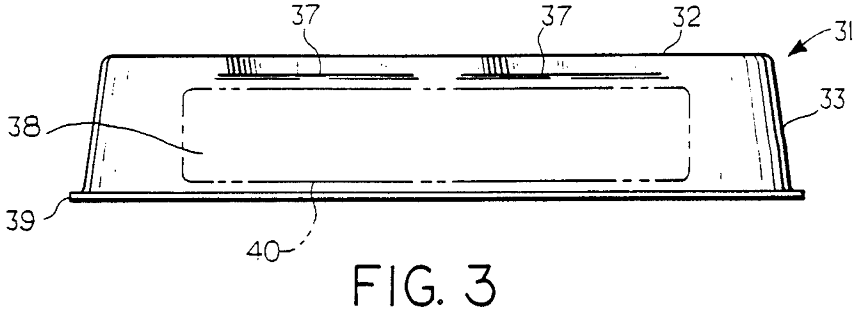
Figure 4:
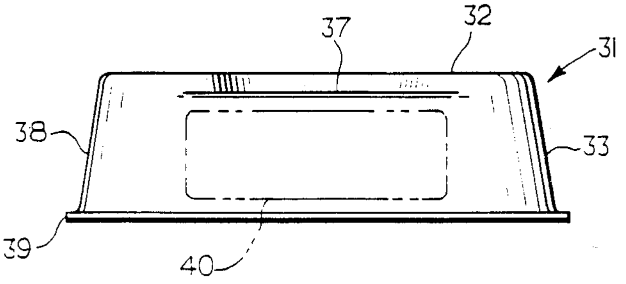

FIGS. 2, 3 and 4 illustrate a carrier, generally indicated by reference numeral 31, for which this embodiment of the invention is particularly well suited for label application. Carrier 31 may be formed in a single piece from a sheet of a suitable thermoplastic material by process which includes a thermoforming operation to shape the sheet into the illustrated complex generally four-sided three dimensional shape. Carrier 31 is designed to be applied to a plurality of filled and capped beverage bottles by being directed downwardly over the tops thereof, and may be dimensionally designed to be used with any of the popular sizes and types of bottles used in packaging single service quantities of a beverage, e.g., 16 oz. glass bottles. A suitable carrier for six (6) of such 16 oz. glass bottles can be formed from a sheet of high density polyethylene of approximately 25 mil (0.025 in.) sheet thickness.

Carrier 31 comprises a top panel 32 and a peripheral skirt 33 which extends downwardly and slightly outwardly from and along the periphery of the top panel 32. The upper portion of the peripheral skirt which extends downwardly for substantially less than one-half of the overall downward extent of the peripheral skirt, comprises plural outwardly convex arcuate first wall portions 35 and plural outwardly concave second wall portions 36, each of which is disposed between a pair of the adjacent first wall portions 35. Carrier 31 also comprises a plurality of ledges 37 that extend outwardly from the second wall portions to merge into the juncture of the remaining portion of the peripheral skirt 33, which extends below the level of the ledges 37. A lip 39 extends outwardly from the lower edge of peripheral skirt 33.

By virtue of the construction of peripheral skirt 33, as heretofore described, large flat surface areas 38 are provided on the front and rear surfaces of the peripheral skirt 33, below the elevation of ledges 37 and above the elevation of lip 39 and between the rounded corners of the carrier, and these surface areas 38 may be provided with visually prominent decorative material 40 in the form of printing on the surfaces or a paper or foil label affixed thereto, and containing, for example, product identifying information and/or the trademark or trademarks of the bottling company or its franchisor. This decorative material 40, in addition to the possible functional advantage which can result from the product identification information which can be incorporated therein, can also be used to enhance the visual characteristics of the carrier and the package which includes the carrier and the filled and capped bottles carried thereby by the selective use of attractive colors and print sizes and styles, as is now done with paperboard and other types of bottle carriers. Similarly, decorative material can also be placed on one or both of the ends of the carrier, as is shown in the end illustrated in FIG. 4.

The top panel 32 of carrier 31 is provided with a plurality of irregularly-shaped but generally circular bottle neck receiving apertures 41. The inside diameter of each aperture is sized to provide an interference fit with the bottom of the closure on the neck of the bottle which is to be inserted through the aperture, or the transfer bead on such bottle, to support the bottle in the aperture from the bottom of the closure or the underside of the transfer bead, as the case may be. The outside diameter of the aperture 41, on the other hand, is larger than the closure and the transfer bead to permit the carrier to be inserted over the top of the bottle with the closure already in place thereon. Part of the space between the outside diameter and the inside diameter of aperture 41 is occupied by a circular array of tabs to retain the containers in the carrier by engaging the bottom of closures on the containers.

The top panel 32 of the carrier 31 is also provided with a pair of finger receiving apertures 42 to permit the carrier with the bottles carried thereby to be conveniently carried by the consumer or by the various personnel who may handle the carrier as part of their employment duties in the bottling plant or the retail store.

As can be seen, when the carrier 31 is retaining a full load of filled containers the snug engagement of the carrier walls with the exterior surfaces of the containers, and the support contact between the containers, provides a relatively rigid, unitary package. However, by itself the carrier is relatively flimsy because of the thin walls and tends to be dimensionally unstable when handled alone, particularly when labels are being applied thereto.

Figure 17:
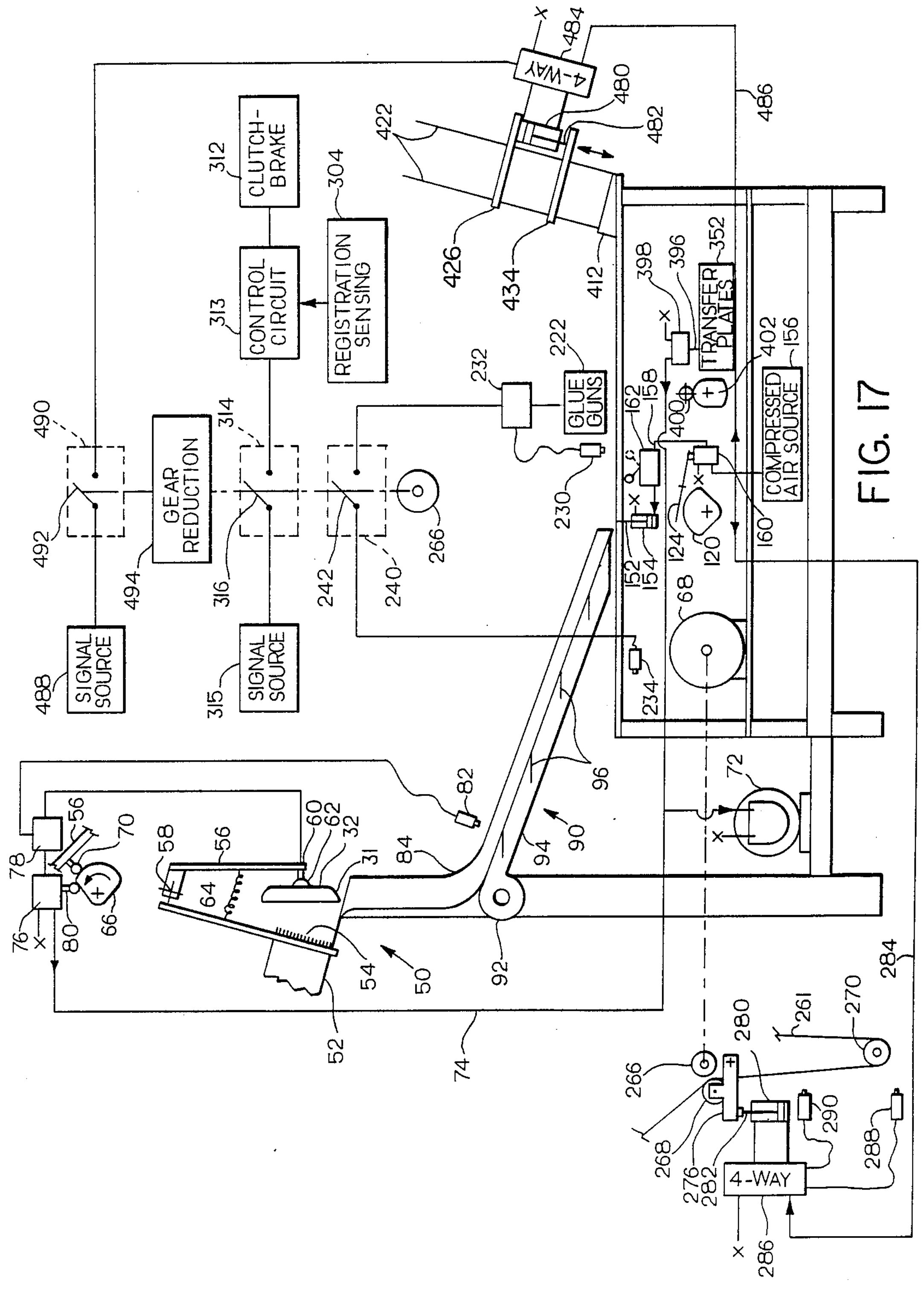
FIG. 17 is a schematic diagram of pneumatic and electric controls used herein.

Returning now to the description of the preferred embodiment, as best seen in FIGS. 1 and 17, a downwardly extending arm 56 is pivotably mounted at 58 and carries on its lower end 60 a suction cup 62 for engaging the top panel 32 of a carrier 31. A spring means 64 yieldingly urges the lower end 60 of arm 56 toward the carrier supply chute 52. As diagramatically shown in FIG. 17 a cam 66 (connected to the main drive motor 68) is rotated 360 degrees for each cycle of the machine. A cam follower 70 is connected to arm 56 and permits the arm 56 to advance suction cup or vacuum means 62 to engage a carrier 31 and then pull a carrier out of chute 52 and yieldingly engaging retention bristles on each side of chute 52 once each cycle.

A vacuum source or pump 72 is selectively connected to the suction means 62 via a conduit 74 and valve 76. The valve 76 is operated by cam follower 80 and cam 66 to open and supply vacuum retention to cup 62 when it contacts the top panel 32 of a carrier 31 at the top of the stack in chute 52 to engage the carrier to pull it from the stack.

A second control valve 78 is provided in series with valve 76 in conduit 74. Valve 78 is normally open to enable the cup/carrier engagement. However, if photoelectric sensing means 80 detects that a previously fed carrier is still in feed chute 84 in a blocking position a signal is generated to close valve 78 to prevent the connection of a vacuum to cup 62, thus preventing pulling of a carrier 31 from the supply chute 52. Sensor 82 can be used to detect the absence of a carrier in the initial deposition point in feed chute 84, the advancement of a carrier to a predetermined position in feed chute 84, or other indication that a carrier should be pulled from supply chute 52.

As also best seen in FIGS. 1 and 17 an air assist means 90 is used to convey or assist the carriers from the initial deposition point in feed chute 84 to the indexing mechanism. A blower 92 supplies a stream of air to duct 94 along one wall of chute 84. Ports 95 are formed in the wall of chute 84 between chute 84 and duct 94. Vanes 96 associated with the ports 95 are formed, as by bending chute wall portions downwardly during formation of ports 95, to direct air streams from blower 92 via duct 94 to chute 84 in the direction the carriers 31 are to be moved. A retention cage or guard 88 keeps the carriers in chute 84.

Figure 5:
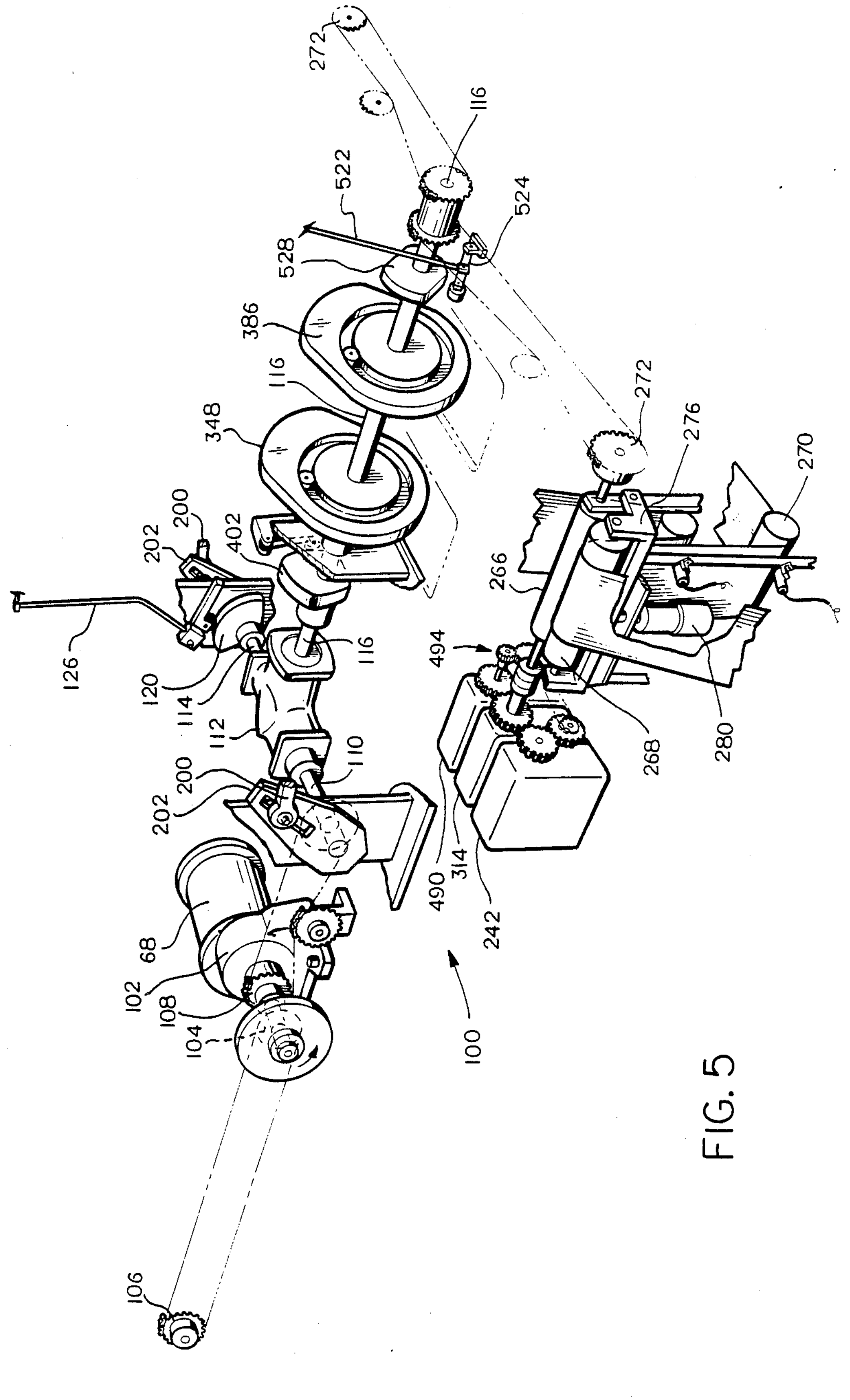
FIG. 5 is a view in perspective of the drive, cam actuating, and linkage mechanisms used in the apparatus of FIG. 1.

Referring now to FIG. 5 there is illustrated the main drive connections 100 for the apparatus. The main drive motor 68 has a speed reduction unit 102 with an output shaft carrying a first drive sprocket 104 which turns cam 66, to control operation of the carrier feeding means 50, via sprocket 106 and connecting sprockets not shown. A second sprocket 108 driven by reduction unit 102 turns secondary drive shaft 110 which provides a power input for bevel gear box 112. A first output shaft 114 of gear box 112 turns an escapement control cam 120 and the indexing mechanism crank 202 at the rear. The indexing mechanism crank 202 at the front is rotated by shaft 110.

The second output shaft 116 of gear box 112 drives the remaining mechanisms as follows. A cam 402 controls the connection of a vacuum source to the label transfer plates 352. A cam 348 controls the raising and lowering of backup platens 340. Cam 386 is connected to reciprocate the label transfer plates 352 transversely to the indexing path of the articles to receive labels. Cam 528 selectively lifts an elevator plate 500 to initiate the restacking of articles after labels have been applied. Finally, sprockets are provided on shaft 116 to drive the pre-feeding nip rolls 266, 268 on each side of the apparatus to pull webs with labels pre-printed thereon from supply reels 252, 260 via sprockets 272. An output from the shaft of the driven roll 266 is utilized to turn mechanical timers 242, 314 and 490. Functions and operation of the mechanisms driven by the connections in FIG. 5 will be described hereinafter as each mechanism is disclosed in detail.

Figure 6:
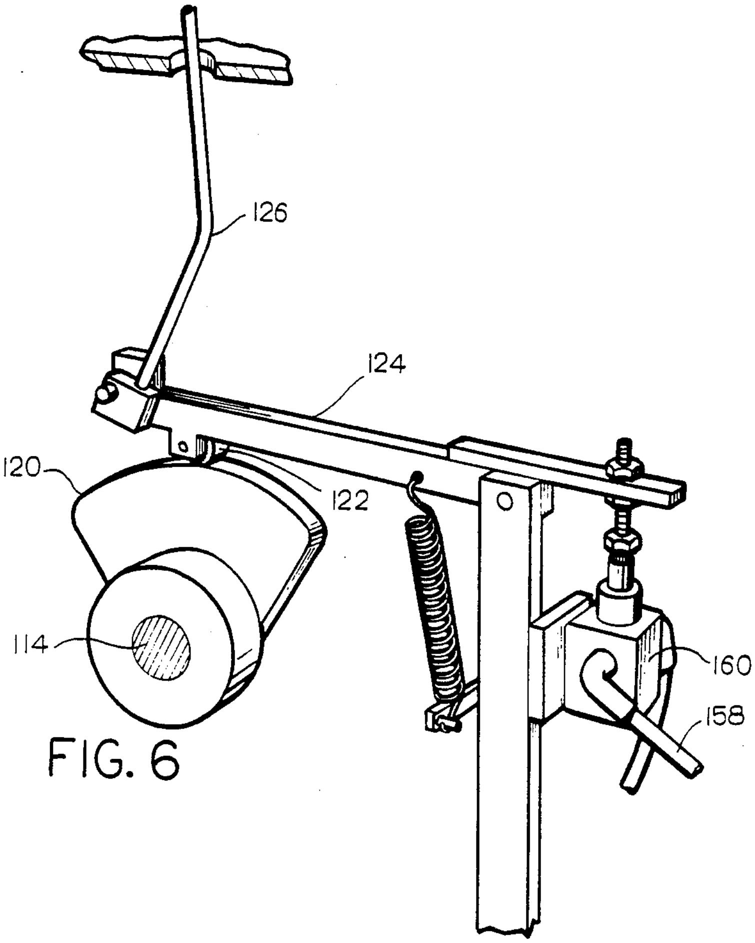
FIG. 6 is a more detailed and enlarged view of the escapement actuating mechanism.
Figure 7:
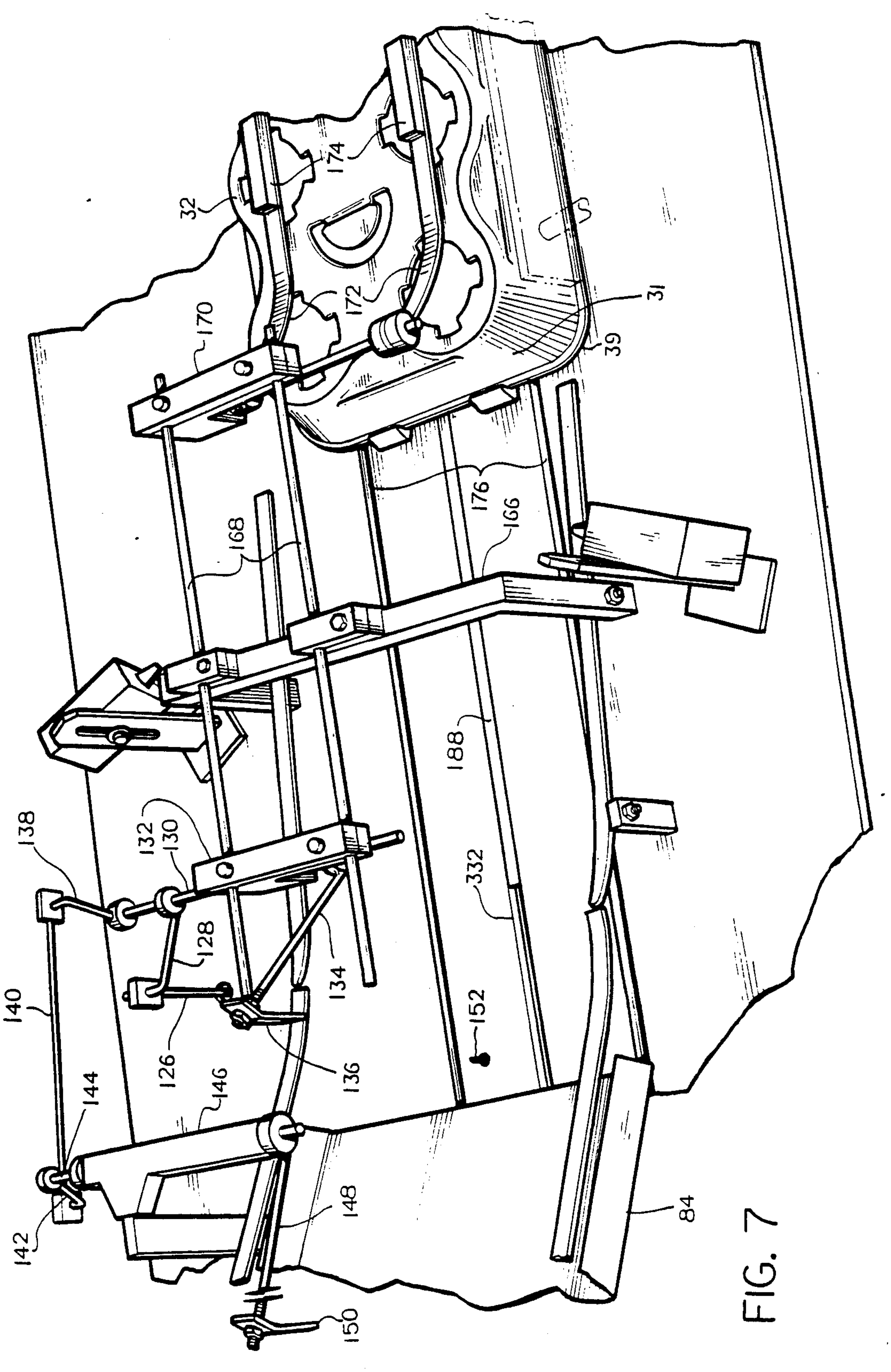
FIG. 7 is an enlarged view in perspective of a portion of the feed chute for articles to receive labels, a portion of the indexing mechanism, and the escapement mechanisms for controllin9 article flow from feed chute to indexing.

Referring now to FIGS. 6 and 7 there is illustrated an escapement mechanism for controlling the flow or feeding of carriers 31 from the feed chute 84 to the indexing mechanism. The cam 120 on output shaft 114 of bevel gear box 112 turns cam 120 once for each cycle of the machine. A cam follower 122 is mounted on a lever 124 which is spring biased toward cam 120 to keep follower 122 in contact therewith. An escapement finger drive rod 126 is pivotally connected to one end of lever 124 and is vertically reciprocated by the cam and follower action. A drive crank 128 is pivotally connected to the upper end of drive rod 126 to rotate in an oscillating motion a first escapement finger shaft 130, which is journally carried in support member 132. An escapement finger 134 on one end of shaft 130 is thereby alternated between up and down positions, with the downwardly depending carrier stop 136 carried on the end thereof alternately permitting passage of a carrier 31 from feed chute 84 to the indexing mechanism or blocking passage of a carrier 31, respectively.

A drive crank 138 on the other end of shaft 130 is also oscillated to reciprocate drive link 140, pivotally connected at one end to drive crank 138 and at the other end to crank 142. The reciprocation of link 140 oscillates a crank 142 secured to one end of a shaft 144 journally supported in a support member 146. A second escapement finger 148 is secured to the other end of shaft 144 is thus alternated between down and up positions, with the downwardly depending carrier stop 150 carried on the end thereof alternately blocking passage of a carrier 31 down the chute 84 to the indexing mechanism or permitting passage of a carrier 31, respectively.

As shown in FIG. 7, when escapement finger 134 is in its elevated position, the preceding escapement finger 148 is in its lowered position, and vice versa. Thus, the escapement fingers are spaced along the path of the carriers and are operated to control the flow of carriers down the feed chute 84 to successively feed the carriers to the indexing mechanism.

An additional means for controlling the flow of carriers is the shaft 152 of an air cylinder 154 (see FIG. 17). The air cylinder 154 is connected to a compressed air source 156 via a conduit 158 and a cam actuated control valve 160 (FIGS. 6 and 17). A manual control valve 162 in conduit 158 may be operated to provide compressed air to air cylinder 154 to raise shaft 152 into carrier blocking position so that the machine may be cycled to test the web feeding, label transferring and the like without carriers being fed to the indexing mechanism. The control valve 160 is actuated by the end of lever 124 opposite the one connected to drive rod 126, so that conduit 158 is closed only when the escapement finger 134 is elevated. Therefore, when the manual control valve 162 is opened for testing, either the escapement finger 134 and stop 136 or the piston shaft 152 blocks the passage of carriers from feed chute 84 to the indexing mechanism.

Referring further to FIG. 7 it can be seen that a bridge 166 straddles the indexing path of the carriers. The bridge 166 carries support rods 168 which, in turn, carry support members 132 and 170 at opposite ends thereof and above the path of the carriers 31. Flexible positioning fingers 172 with weights 174 on the end thereof bear on the top panel 32 of a carrier 31 at the label application station. The fingers 172 are yieldingly urged downwardly by the weights 174 to engage the surface of the carrier on the opposite side of the carrier from the indexing means to assist in retaining the carrier in position at the label application station while the backup platens are being raised inside the carrier and while the labels are being applied.

Rail means 176 are disposed on each side of a reciprocable indexing member 188 to support the lips 39 of the carriers 31 above the upper deck plate 332 of the apparatus. As will be explained hereinafter, the rails 176 assist in the indexing operation.

Figures 8, 8A:
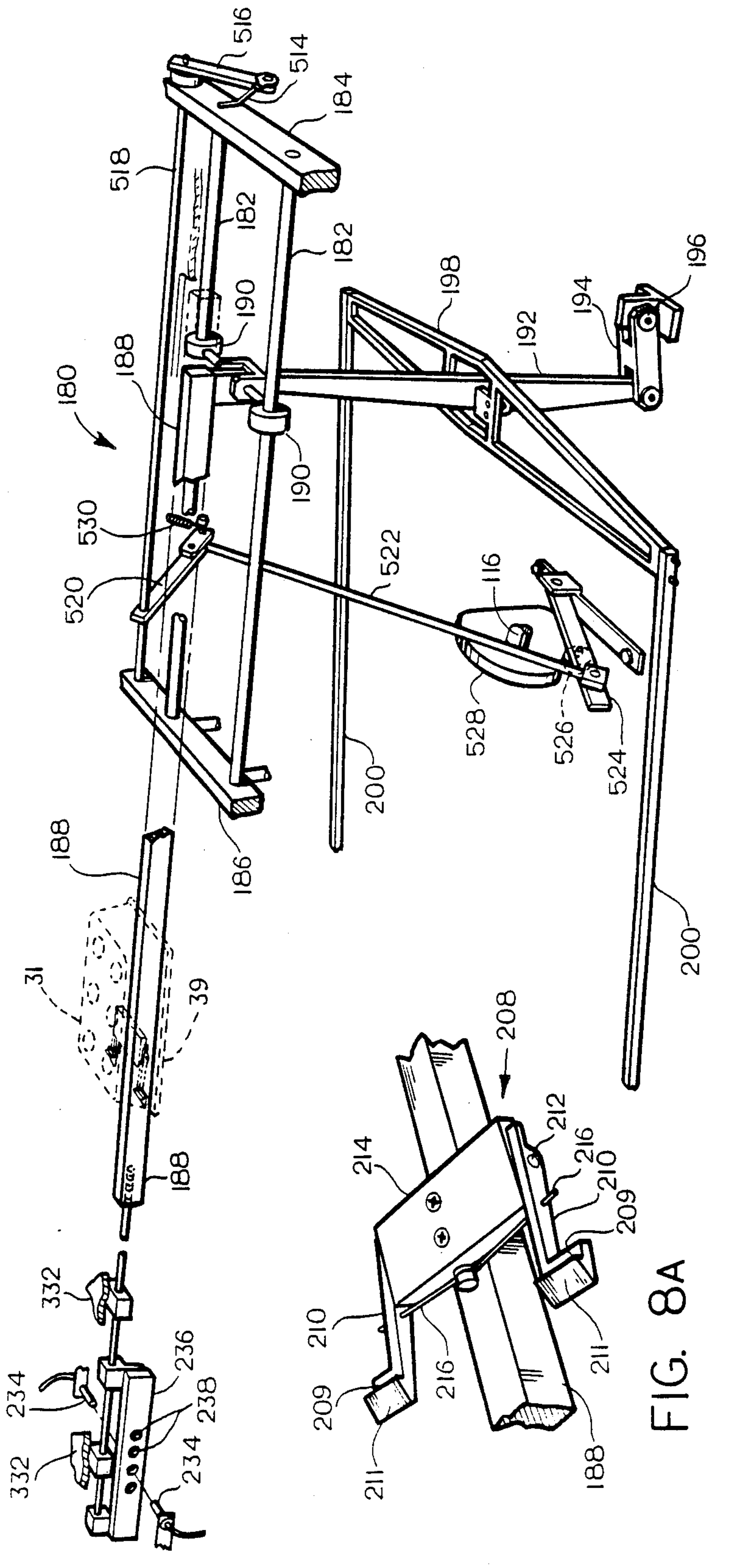
FIG. 8 is a partial view in perspective of the indexing mechanism, glue pattern activation control, and elevator plate operation linkage for stacking articles that have been labeled.
FIG. 8*a* is an enlarged perspective view of a carrier engaging mechanism for indexing carriers.

Referring now to FIG. 8, an indexing mechanism is generally indicated at 180. A pair of parallel, spaced-apart slide rods 182 are carried in support members 184, 186 which depend below the upper deck plate 332 of the apparatus. A linearly reciprocable member 188 is movable in a first direction to index carriers 31 through a label application station 250 (see FIG. 1), and movable in a second direction to return to an article indexing position. The indexing bar 188 is slidably carried by guide blocks (not shown) which are secured to upper deck plate means 332.

The rear end of bar 188 is connected to bar drive supports 190 which are slidably mounted on slide bars 182. A drive lever 192 has an upper end pivotally connected to bar drive supports 190, and has lower end pivotally connected to a link 194 which, in turn, is pivotally secured to the frame of the apparatus at 196. The middle of the lever 192 is pivotally connected to a beam 198. Connecting rods 200 at each end of beam 198 are pivotally connected to cranks 202 (see FIG. 5). As discussed hereinbefore, cranks 202 are rotated by power shafts 110, 114 and through the connecting rods 200, beam 198 and lever 192 convert the rotary motion of cranks 202 to linear reciprocation of the indexing bar 188.

A plurality of carrier engaging means 208 (best seen in FIG. 8*a*) are secured to the top of indexing bar 188 (see FIG. 8). Each carrier engaging means 208 includes a pair of pawls 210 which are pivotally mounted at 212 to a pawl support member 214. Spring means 216 yieldingly urge the forward ends of the pawls 210 upwardly for engagement of the carriers 31. Stop means on the support member 214, preferably on the side of member 214 opposite the carrier engaging ends of pawls 210, may be utilized to limit the upward travel of the forward ends of the pawls 210. As may be best seen in the enlarged detail in FIG. 8*a*, each pawl 210 has a catch or hook surface 209 formed thereon for engaging the lip 39 of a carrier 31. The forward end of each pawl 210 has an inclined surface means 211 formed thereon ahead of the catch surface means 209. The leading edge or beginning of the inclined surface 211 is positioned below the lower edge of lip 39 of a carrier 31, since the carrier 31 is elevated above the upper surface of upper deck plate 332 by rails 176 (see FIG. 7). This enables passage of the pawls 210 under and past a carrier 31 on the return stroke of the indexing bar 188 without jamming against the leading edges of the carriers 31

Figure 9:
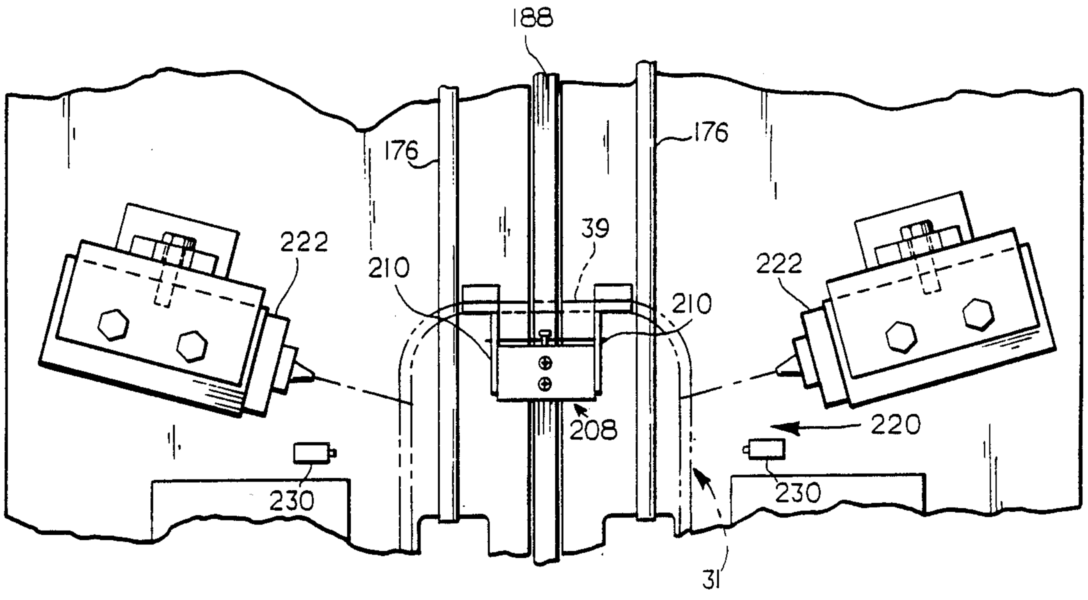
FIGS. 9 and 10 are plan and side elevational views of an adhesive application station.
Figure 10:
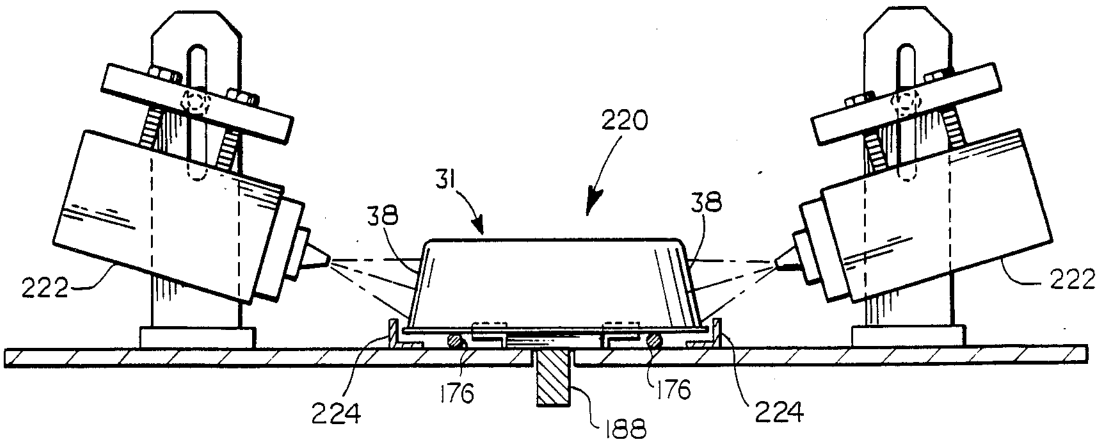

The general position of an adhesive application station 220 is indicated in FIG. 1 and is shown in detail in FIGS. 9 and 10, with controls illustrated in FIG. 17. The station includes opposed glue guns 222, of the electrically activated hot melt type, mounted on each side of the indexing path of carriers 31. Guide rails 224 on each side of the path aid in positioning carriers 31 both for the adhesive application operation and for the receipt of the backup platens from below, as will be described hereinafter.

It is desired to apply a predetermined pattern of material, in this case adhesive, to an article just prior to a succeeding operation, which would be the application of labels to opposite sides of the carrier. Therefore, the pattern of adhesive is applied by glue guns 222 as the carriers are actually moved into a label application position by the indexing bar 188. The controls to accomplish this delicate operation are illustrated in FIG. 17.

A first photocell means 230 detects the presence or absence of a carrier to receive the adhesive. If a carrier is present, photocell means 230 generates a signal to gate a control circuit 232 to enable reception of an activation signal or signals to trigger the glue guns 222. A pattern member 236 is secured to the end of indexing bar 188 (see FIG. 8) and is linearly reciprocable in response to the indexing movements of bar 188. A pattern of activation indicia, in this instance a plurality of apertures 238 bored through member 236, is carried by the pattern member. Photocell means 234 mounted on the under side of upper deck plate means 332 are disposed along the path of movement of the pattern member 236. As each activation indicia or aperture 238 passes between the photocell means 234, an activation signal is generated for glue guns 222. As seen in FIG. 17, signals from photocells 234 are routed through mechanically operated switch means 242 of the mechanical timer 240. The mechanical timers 240, 314 and 490 are commercially available units which can be selectively set to open and close internal switches at predetermined times in a cycle. The timer 240 is driven from the shaft of the nip roll 266 and is set to close switch 242 during the indexing stroke of bar 188, and open switch 242 during the return stroke of bar 188. When closed, switch 242 routes activation signals to control circuit 232 to trigger glue guns 220 to apply adhesive to carriers as they are moving or being indexed into label receiving position. When opened, switch 242 disarms the glue guns preventing receipt of an activation signals during the return stroke of indexing bar 188.

The above method and apparatus provides an inexpensive, simple and accurate means for controlling a pattern of deposition. Moreover, it is directly responsive to the speed of movement of the carrier, so that if the cycling or indexing speed of the apparatus changes for any reason during the operation, the controls adapt directly and instantaneously. If the series of adhesive dots had their size and spacing controlled by a timer or other means not responsive to the speed of movement of the article receiving the depositions, any change in machine speed would result in deposition changes that could not be tolerated.

It is possible to adjust the pattern by changing the location and pattern of the activation indicia by simply substituting a new pattern member with a new pattern of activation indicia thereon. It is to be noted that the pattern member does not have to be linearly reciprocable, but could be rotatable in response to movement of a carrier, for example. Although apertures and a light beam are used in this embodiment, other activation indicia and sensing means therefor could be used to sense the arrival of each indicia at a predetermined point in its travel. Obviously, more than one means for selectively applying material to the moving article could be used on each side of the article to apply a desired pattern of material on the article. Also, other means could be used for inhibiting application of material on a return stroke, and for inhibiting application in response to the absence of an article to receive the material.

Although the embodiment herein discloses the application of adhesive to carriers before labels are attached, it is obvious that it has broader uses in material application apparatus for applying a predetermined pattern of material to articles, and particularly to a succession of moving articles. A plurality of activation indicia is arranged in a pattern. The pattern is moved in response to movement of an article to receive material. The arrival of each indicia at a predetermined point in its travel is sensed and a signal generated in response thereto. Material application means selectively applies material to the moving article in response to each signal generated. The material application means may be advantageously located prior and adjacent to a succeeding operation station for the article. If the articles are successively indexed into the operation station, the indicia movement may be made responsive to the operation of the indexing means.

Figure 11:
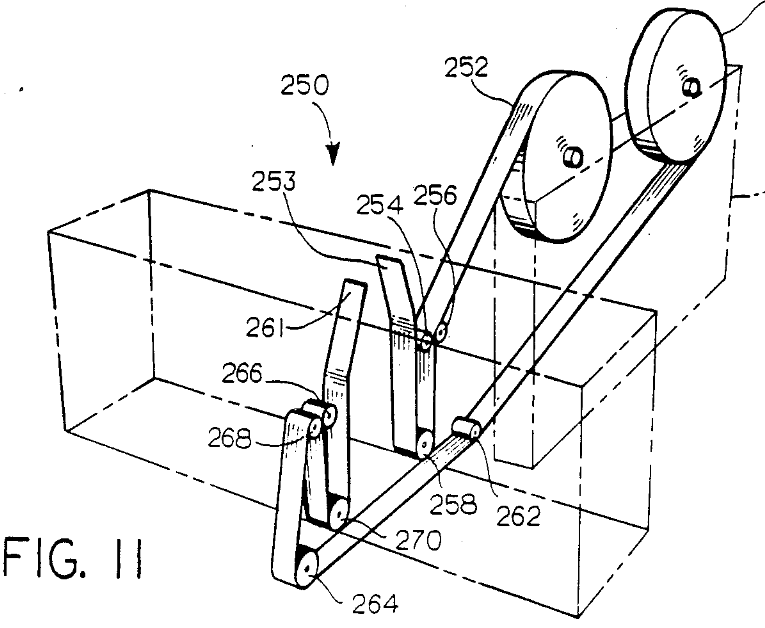
FIG. 11 is a view in perspective of the web feeding paths to supply labels to each side of the indexing path of the articles through a label receiving station.

Referring now to FIGS. 11 through 15 there is illustrated a label application station 250. In FIG. 11 webs having labels pre-printed thereon are supplied from reels 252, 260 of label stock which are supported for unwinding on a suitable reel stand 251. A web 253 from reel 252 is guided through a first set of pre-feed nip rolls 254, 256 and under a dancer roll 258 up to a second set of feed nip rolls 300, 302 (FIG. 13) on the rear of the machine. A web 261 from reel 260 is taken under the machine by guide rolls 262 and 264 and then upwardly to pre-feed nip rolls 266, 268, downwardly under dancer roll 270 and thence upwardly to feed rolls 300, 302 on the front of the machine.

Figure 12:
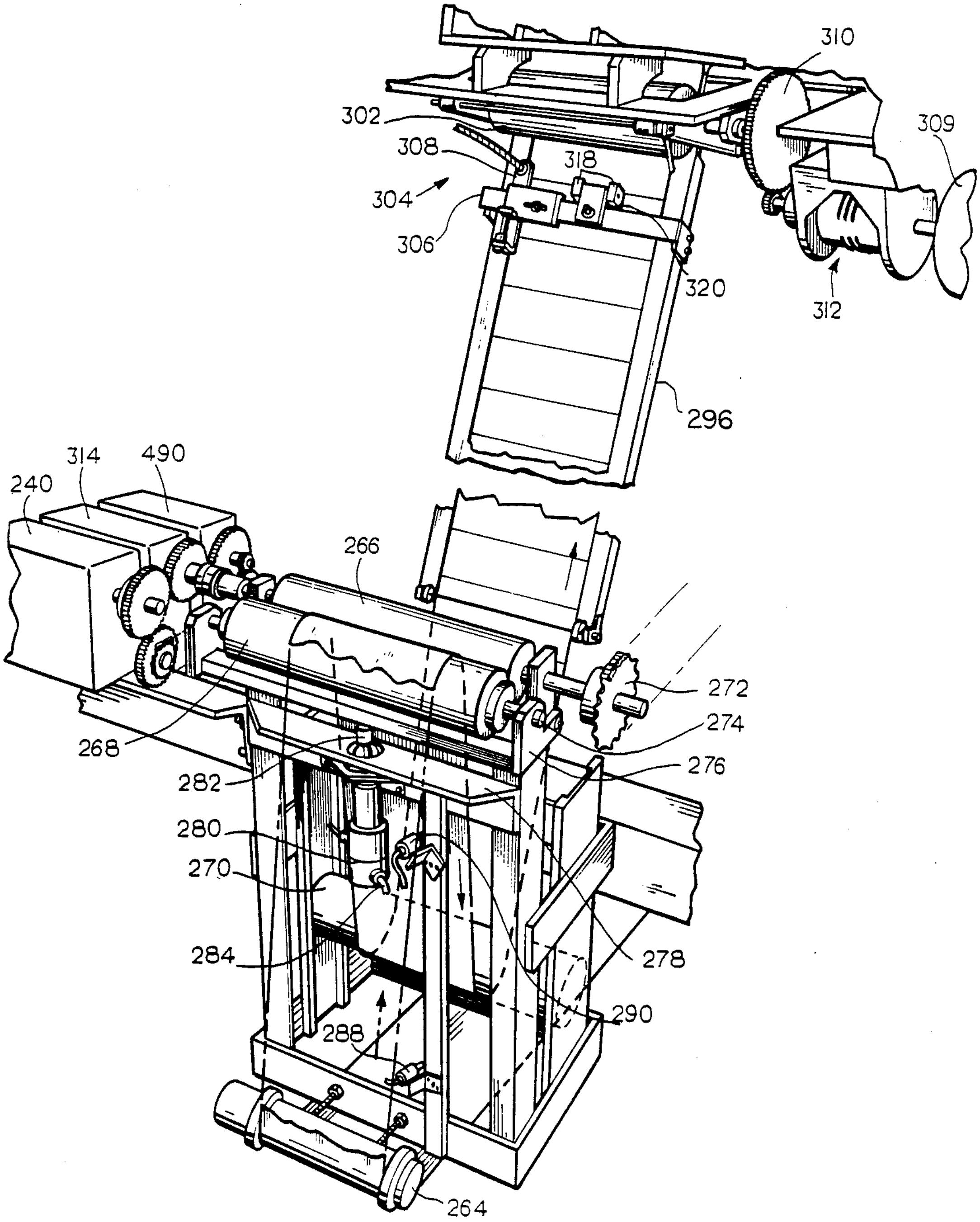
FIG. 12 is a view in perspective of one of the web feeding positions.

As seen in FIGS. 5 and 12 pre-feed sprockets 272 on the front and rear are continuously driven from power shaft 116. The idler roll shaft 274 (FIG. 12) of pre-feed roll 268 is journally supported in bracket 276 which in turn is pivotably supported on frame portion 278. An air cylinder 280 is attached to frame portion 278 and has a piston shaft or ram 282 extending therefrom to bear against pivotable support bracket 276.

As schematically noted in FIG. 17 a compressed air source 156 is connected to air cylinder 280 via a conduit 284 and a four-way valve 286. A photocell means 288 is positioned to detect a predetermined desired low position of the bottom of a storage loop of web 261. The loop is maintained in an extended vertical disposition by the dancer roll 270, which is freely vertically reciprocable as well as freely rotatable in its mounting in frame portion 278. A signal from photocell 288 to valve 286 closes the valve and permits bracket 276 to pivot idler roll 268 away from contact with the driven roll 266 in response to the retraction of ram 282 of cylinder 280. Therefore, although the continuously driven roll 266 continues to rotate, a pre-feeding of the web to the storage loop ceases.

As the web 261 is pulled from the storage loop by feed nip rolls 300, 302, the length of the loop shortens and the bottom thereof and the dancer roll 270 rise vertically. When the bottom of the loop reaches a predetermined upper level, indicating that more web is required, photocell 290 detects the bottom of the loop and generates a signal to open valve 286 to supply compressed air to cylinder 280, raise ram 282 and pivot bracket 276 to place the idler roll 268 in contact with driven roll 266, starting the feeding of web 261 to the storage loop again.

The pre-feed mechanism and method just described is provided to avoid the requirement for taking web directly from a reel of label stock, since the web is intermittently or variably fed to the shearing or label formation apparatus. The force required for direct feeding is excessive, particularly when it is a start-stop operation. Moreover, the use of such excessive force may interfere with the accuracy of the variable feed to a shearing apparatus.

Figure 13:
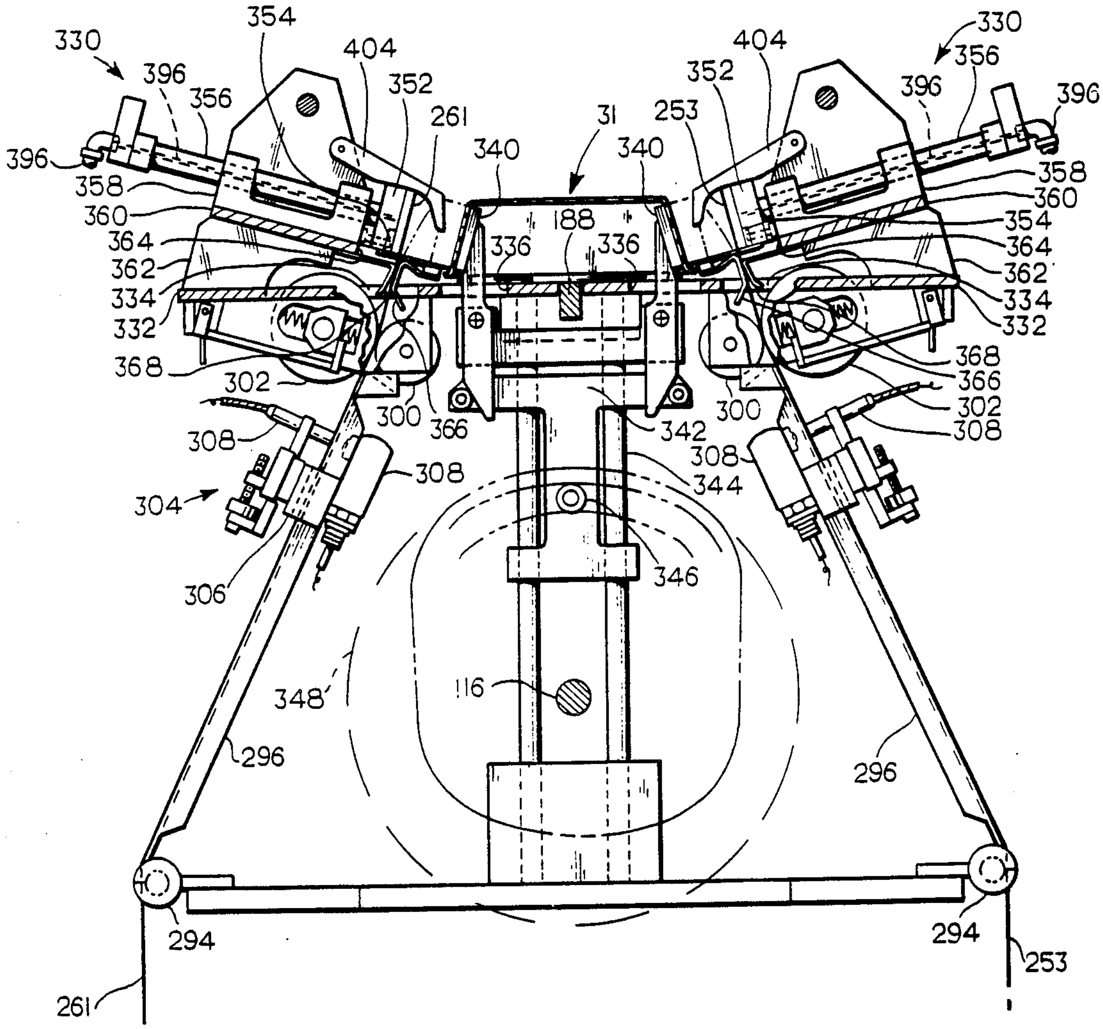
FIG. 13 is a cross-sectional view of the apparatus taken adjacent to and illustrating the label transfer apparatus.

Referring now to FIGS. 12 and 13 there is illustrated the final web feeding and label formation. Since this apparatus is essentially the same on both sides of the indexing path, identical reference numbers have been used in the drawings where applicable. Web guides 294 direct the web from the dancer rolls over web support platforms 296 to web feed driven roll 300 and idler roll 302. A registration sensing means indicated generally at 304 is mounted on a bracket 306 which bridges the web and is attached to platform 296. Registration sensing is accomplished by using a photocell scanning system 308 to detect a registration indicia, which may be a mark, the ending or beginning of a solid color or the like, to generate a signal which disengages the clutch and applies the brakes in a clutch-brake mechanism 312. This interrupts the rotation of driven roll 300 by electric motor 309 through mechanism 312 to a feed gear 310 on the shaft of the driven roll 300.

Referring to FIG. 17, the control circuit for variably feeding the web is illustrated. A signal source 315 is connected through mechanically operated switch contacts 316 of a mechanical timer 314, driven from the shaft of pre-feed nip roll 266 as hereinbefore described. The switch 316 is timed to close when the shear for web cutting clears the shear point on its return stroke. The signal from source 315 is provided through a control circuit 313 to the clutch-brake 312 to release the brake, engage the clutch and rotate driven roll 300 to advance the web past the shear point. When registration sensing means 304 detects a registration indicia on the web, a signal is sent to control circuit 313 to interrupt the application of the signal from source 315 to the clutch-brake 312 causing the clutch to be disengaged and brake applied to stop web feeding.

Details of the control circuit 313 are not illustrated since the function may be obtained in a number of different ways. For example, circuit 313 may include a normally-closed relay which connects the signal source 315 to the clutch-brake 312. The signal from source 315 may also be fed through a delay circuit to close a normally-open relay which is connected to enable a registration signal to energize and open the normally-closed clutch brake relay. The sequence of operation would be as follows. When the mechanically operated switch 316 is closed, the signal source 315 would be connected to clutch-brake 312 through the normally-closed relay, because the normally-open relay controlling the registration signal prevents the registration signal from opening the normally-closed relay. The clutch-brake then allows rotation of nip rolls 300, 302 which starts to advance the web and moves the current registration indicia out of sensing alignment, thus removing the registration signal so that the normally-closed relay cannot be opened.

After a delay and after the current registration indicia has moved, the signal from source 315 closes the normally-open registration relay. The nip rolls 300, 302 continue to rotate until the next registration indicia appears on the web below registration sensing means 304, generating a signal through the now closed normally-open registration relay which opens the normally-closed signal source relay to stop rotation of the nip rolls. Later in the cycle, the mechanically operated contacts 316 are opened by timer 314, removing the signal through the delay circuit which has kept the normally-open registration relay in a closed condition. The operation is now ready for the next cycle of web feeding and label shearing.

In FIG. 12 there is illustrated a means for preventing reverse movement of the web which would lead to malformation of labels, malfunction of registration sensing and other problems. A pair of stop means 318 are pivotally mounted on the bridge bracket 306 which is attached web feed support platform 296. The stops 318 are formed from a material such as rubber which will engage and hold the web material. Each of the stops has rounded lower corners 320 which will allow the stops to be pivoted in counterclockwise direction in response to passage of the web between the stops 318 and support platform 296 in a forward direction toward feed nip rolls 300, 302, and will permit free passage of the web in that direction.

However, when feeding of the web ceases, any reverse movement of the web back down the support platform will cause clockwise rotation of the stops 318 engaging the cam type rounded corners 320, and cause a wedging of the cam type corners to hold the web against the support platform 296. When the web is pulled in the forward direction again, the cam type corners 320 rotate out of the wedge position and allow free passage of the web thereunder.

There has thus been described apparatus for variably feeding a web of material which includes means for cutting strips from a web of material, means for detecting the completion of a strip cutting operation and initiating the feeding of the web past the cutting means, and means for detecting the advance of a desired length of web past the cutting means for interrupting the feeding of the web. Feeding nip roll means engage the web and is operable to advance the web in response to the detection of the the completion of the web cutting operation. Means are provided for maintaining the web flat to enable accurate operation of registration indicia detecting means which controls the amount of advance. This may include means for applying tension to the web between the feeding nip roll means and a point past the registration indicia detecting means, such as the weight of the dancer roll in the storage loop of pre-fed web. In addition, the platform means supports the web for reading at the registration detection area.

Figure 14:
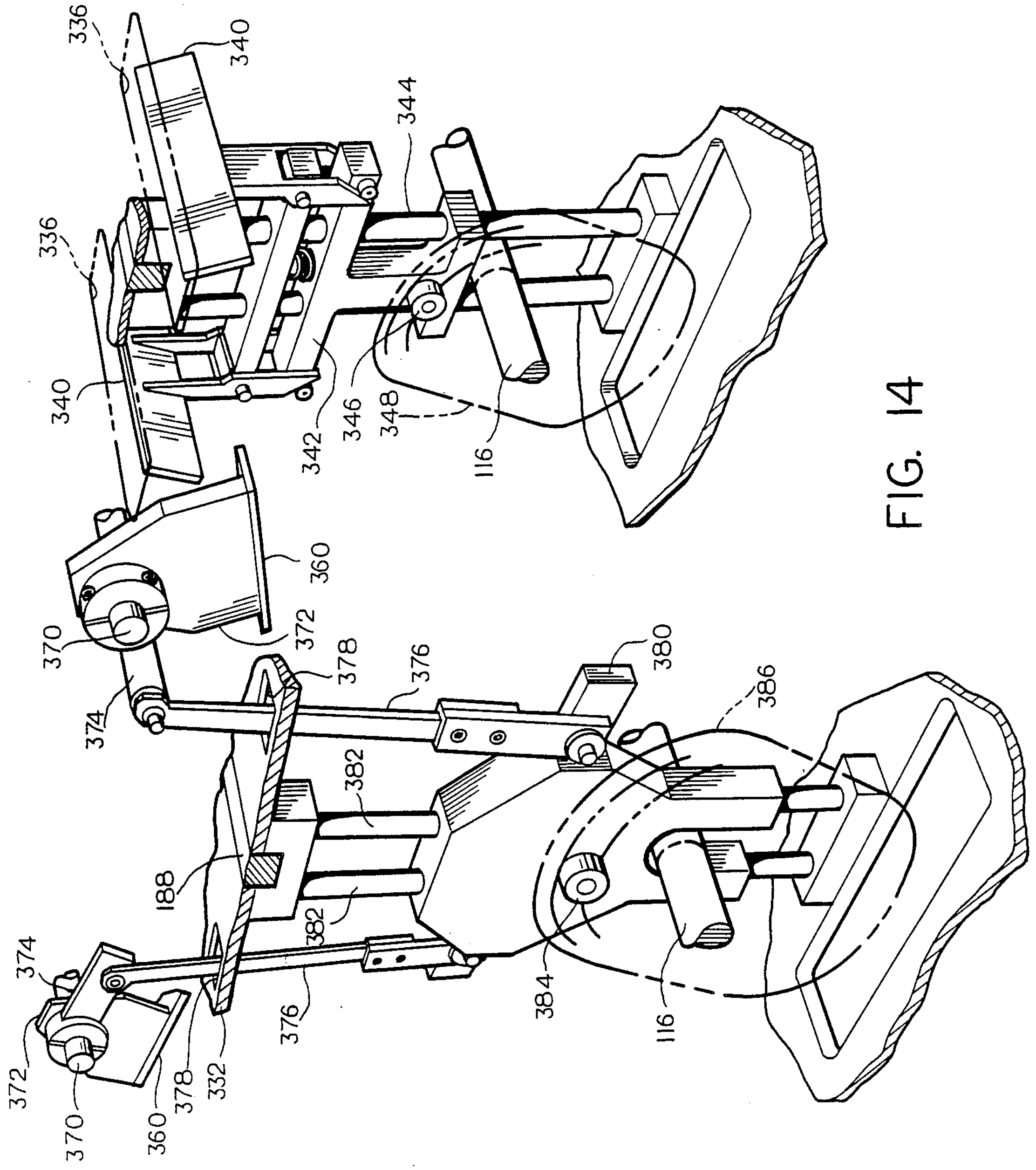
FIG. 14 is a view in perspective of the cam drive for the label shear and transfer apparatus and for the raising and lowering of the backup platen for article wall support.
Figure 15:
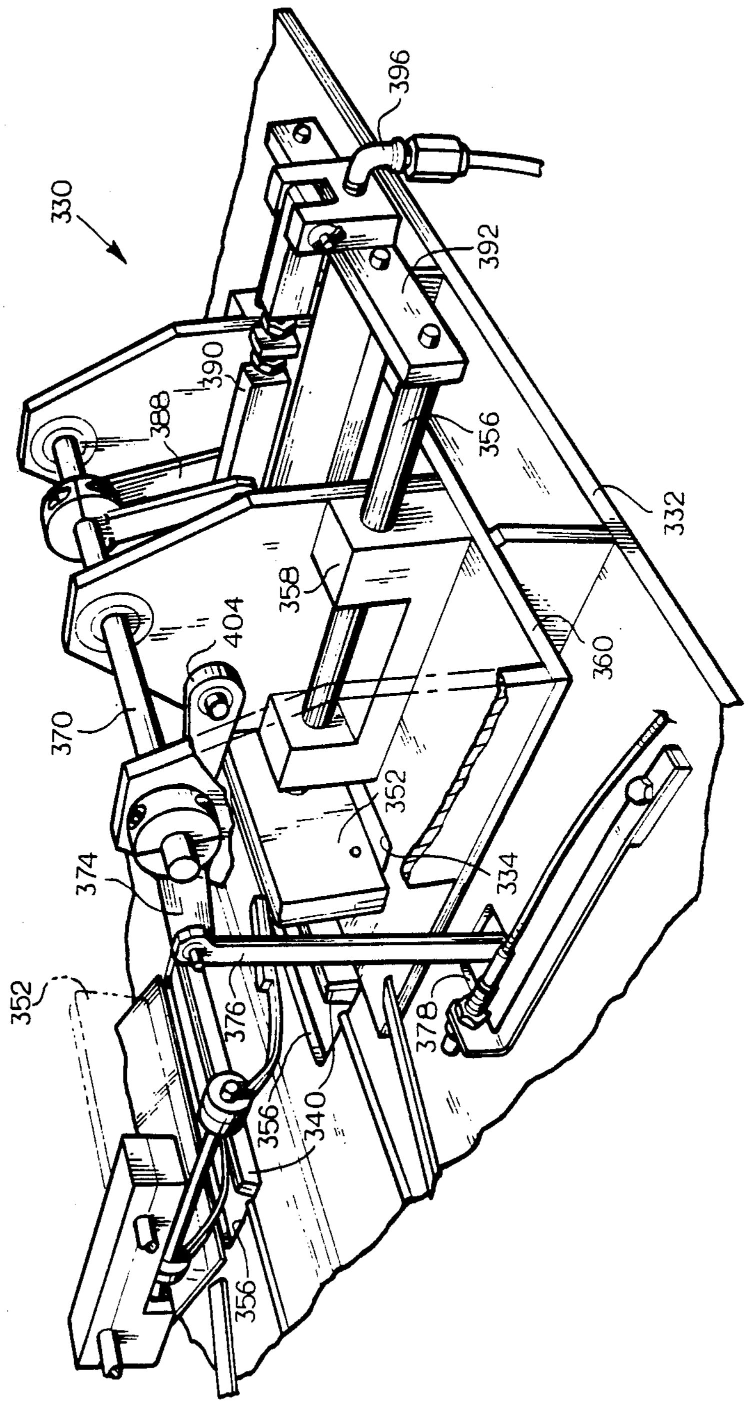
FIG. 15 is a view in perspective of the reciprocal label transfer apparatus.

Referring to FIGS. 13, 14 and 15 there is illustrated label shear and transfer apparatus indicated generally at 330. Upper deck plate means 332 has web feed and idler roll openings 334 and backup platen openings 336 formed therein. Backup platens 340, best seen in FIG. 14, are vertically reciprocable on platen support bracket means 342 which is slidably journaled on vertical slide rod means 344. The bracket 342 and thus the platens 340 are vertically reciprocable in response to the inter-reaction of cam follower 346 with a cam track formed in platen cam 348 on power shaft 116.

The cam 348 is disposed on shaft 116 so that the backup platens 340 are raised from the position shown in FIG. 14 to the position shown in FIG. 13 immediately after a carrier 31 is indexed into a label receiving position above the backup platens. As best seen in FIG. 13, the backup platens 340 are raised into a position behind the side walls of a carrier 31, to provide support to the thin, flimsy side walls and prevent any substantial movement of the side walls as labels are pressed against the side walls by transfer plates 352. After the labels are transferred to the side walls of the carrier 31, the cam 348 and cam follower 346 lower the backup platens out of the way so that the labeled carrier can be indexed out of the label receiving position.

Label transfer plates 352 are disposed on each side of the path of the carriers 31 at the label application position and carry shear blades 354 on the bottom edges of each plate 352. The plates 352 are mounted on slide rods 356 which are journally and slidably carried in slide blocks 358 mounted on transfer support plates 360. Positioning blocks 362 support the plates 360 at an angle with respect to the horizontal so that contact of the transfer plates 352 with the inclined side walls of the carrier 31 will be perpendicular.

Apertures 364 are formed in the support plates 360 to permit feeding of the web therethrough. Web guides 366 and 368 guide the web through the aperture 364 and hold the web in an upright position for shearing of a label therefrom. The upper edge of the web guide 366 may also be used as a shear surface to cooperate with shear blade 354 on the bottom of transfer plate 352 to cut a label from the web.

As can be best seen in FIGS. 14 and 15, the transfer plates 352 are reciprocated toward and away from the carriers 31 by providing a crank shaft 370 journally supported in bearing plates 372 which are attached in an upright position to support plate 360. A crank 374 is secured to the outer end of crank shaft 370. A link 376 is pivotally connected at its upper end to crank 374 and at its lower end to a vertically reciprocable driving bracket 380. The link extends through a link aperture 378 formed in upper deck plate 332. The driving bracket 380 is slidably journaled on vertical slide rods 382 and is reciprocated by the cooperation between a cam follower 384 and a transfer plate cam 386 having a cam track formed therein.

A second crank 388 is secured to crank shaft 370 intermediate the ends thereof, and is pivotally connected to a link 390 which, in turn, is pivotally connected to a rear bracket 392 on the transfer plate support rods 356.

In operation, after the carrier is indexed into label receiving position and as the backup platens are being raised, the cam 386 raises the cam follower 384 and thus the bracket 380 to which the follower is attached. Link 376 pushes the outboard end of crank 374 up, rotating crank shaft 370 in a clockwise direction, turning the outboard end of crank 390 toward the carrier, pulling bracket 392 toward the carrier, pushing slide rods 356 toward the carrier, and thus moving transfer plates forward to press labels on carriers 31 at the label receiving position. As described above, backup platens 340 have been raised to a carrier side wall support position when the transfer plates 352 press labels against the side walls.

As best seen in FIG. 13, with controls therefor illustrated in FIG. 17, a vacuum source such as vacuum pump 72 is connected to the label contacting face of the transfer plates 352 via conduit 396 and control valve 398. The valve 398 is opened by cam follower 400 which is operated by cam 402 mounted on power shaft 116. The cam is positioned on shaft 116 to open valve 398 after the label has been sheared from the web, so that the vacuum on the face of the transfer plate will not interfere with the feeding of the web up in front of the transfer plate prior to the label shearing operation. As also best seen in FIG. 13, loosely pivoted fingers 404 hold the label upright until the advancing transfer plate 352 adheres the label thereto by vacuum retention.

Figure 16:
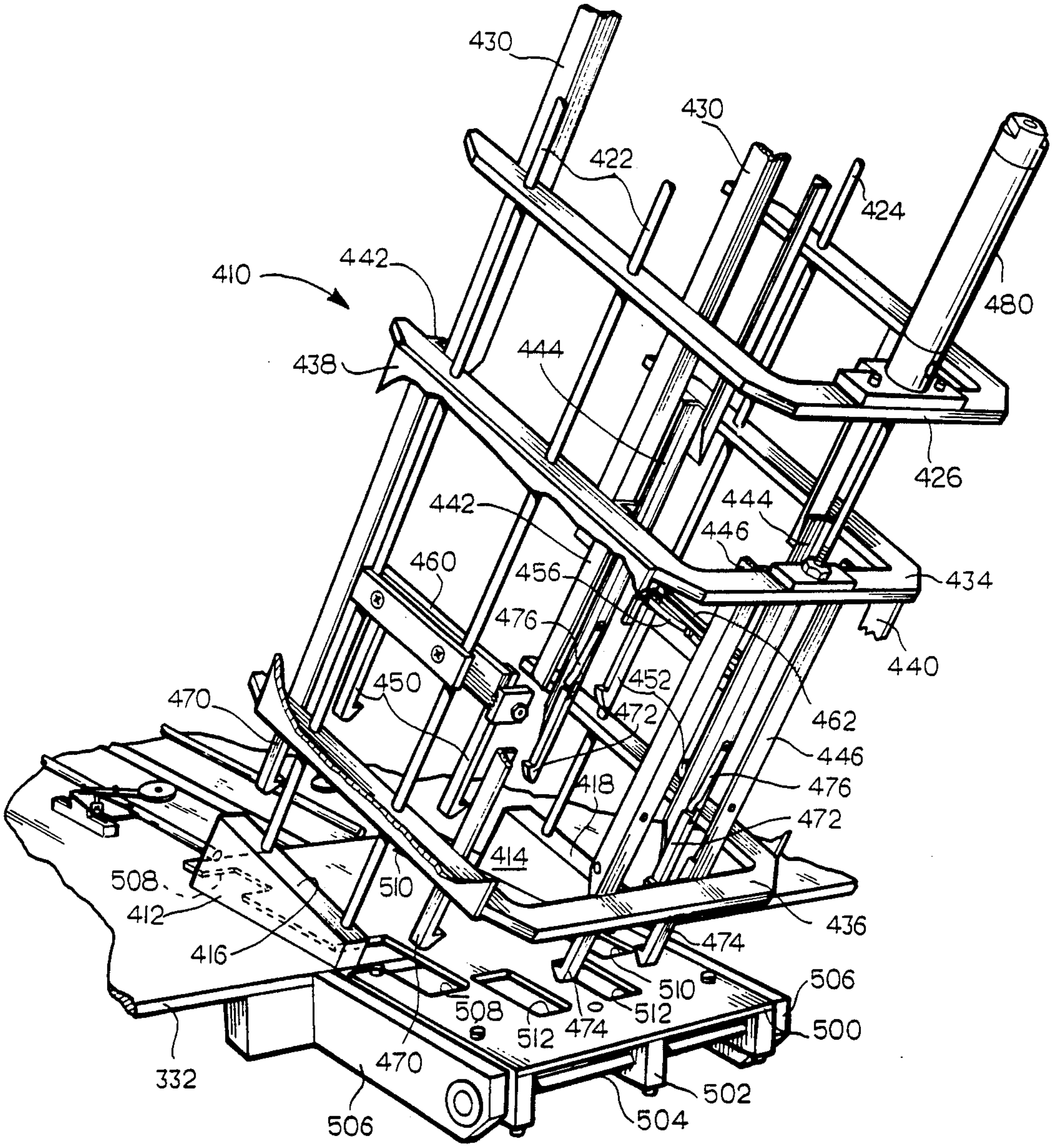
FIG. 16 is a view in perspective of apparatus for restacking articles after they have received labels.
Figure 16A:
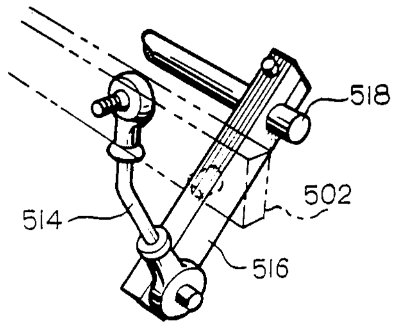
FIG. 16*a* is an enlarged perspective view of the final stage of mechanical apparatus for periodically pivoting the elevator plate.

Referring now to FIGS. 1, 16 and **16*a*, with controls illustrated in FIG. 17, there is illustrated apparatus for stacking articles indicated generally at 410, which is particularly useful for re-stacking carriers 31 after they have received labels. Mounting blocks 412 and 414 are secured to upper deck plate means 332 parallel to each other and spaced apart to allow carriers 31** to be indexed into an initial stacking position therebetween by the indexing mechanism described hereinbefore.

In the embodiment disclosed herein it is desirable that the guideway for receiving a stack of carriers be tilted fifteen degrees from the horizontal. This is accomplished by providing upper surfaces 416, 418 of the mounting blocks 412, 414, respectively, that are inclined fifteen degrees from the horizontal and constructing the guideway perpendicular or normal to the inclined surfaces 416, 418.

The article guideway is constructed by mounting a first pair of frame rods 422 perpendicular to and in the upper surface 416 of mounting block 412, and a second pair of frame rods 424 perpendicular to and in the upper surface 418 of mounting block 414. An intermediate height stationary U-shaped bracket 426 and an upper stationary U-shaped bracket 428 (see FIG. 1) are secured to the pairs of frame rods 422, 424. The U-shaped brackets 426, 428 are open in the direction opposite to the tilt of the guideway. A plurality of internal carrier or article guide members 430 are secured to the three closed sides of the U-shaped brackets 426, 428 to form an upper rack or guideway to retain stacked carriers or articles. In this instance, the stack is retained by gravity because of the fifteen degree tilt of the guideway opposite to the open side, which permits easy removal of a stack of articles.

A lower pair of U-shaped brackets 434 and 436 are slidably mounted on the pairs of frame rods 422, 424 for vertically reciprocable movement. The U-shaped brackets 434, 436 are maintained in their vertically spaced position by opposed side plates 438, 440 secured to the legs of the U-shaped brackets on the outside of the pairs of frame rods 422, 424. Internal carrier or article guide members 442, 444 and 446 are secured to the three closed sides of the lower pair of U-shaped brackets 434, 436. That is, the article guide members 442, 444 and 446 cooperate with the U-shaped brackets 434, 436 and side plates 438, 440 to form a vertically reciprocable lifting rack for the carriers.

Stationary and opposed upper pairs of pawls 450 and 452 are secured to the pairs of frame rods 422 and 424, respectively, by means such as brackets 460, 462. Each pawl is pivotally mounted and spring biased to yieldably urge the catch or hook portion of the pawls into engagement with and support of carriers 31 by the lips 39. Steel spring 456 is exemplary of this spring biasing in conjunction with one of the pair of pawls 452. Thus, when carriers 31 are lifted up the guideway the contact between the carriers and the inclined surfaces urges the pawls outwardly until the catch surfaces are reached. At this time springs, such as 456, urge the catch surfaces below the lips 39 of a carrier to support that carrier and all carriers stacked thereon in the guideway.

A first pair of lower pawls 470 are secured to the inside of the lifting rack on one leg of the bottom U-shaped bracket 436. A second, opposed pair of pawls 472 are secured to the inside of the lifting rack on the other leg of bracket 436. A third pair of pawls 474 are secured to the back of the U-shaped bracket 436. Each of the pawls is pivotally mounted and spring biased to yieldably urge the catch or hook portion of the pawls into engagement with and support of carriers 31 by lips 39. Steel springs 476 are exemplary of this spring biasing in conjunction with the pair of pawls 472. When a carrier 31 is lifted by elevator plate 500 into the lifting rack the contact between the carrier and the inclined surfaces of the pawls urges the pawls outwardly until the catch surfaces are reached. At this time the springs, such as 476, urge the catch surfaces of the pawls of the lifting rack below lips 39 of the carrier to support that carrier and all carriers stacked thereon in the lifting rack.

The lifting rack is reciprocated vertically along the guideway by the action of an air cylinder 480, secured to stationary U-shaped bracket 428, which has a piston shaft 482 secured to the U-shaped bracket 434 at the upper part of the lifting rack to slide the lifting rack up and down on the frame rods 422, 424. The cylinder 480 is double acting in that air pressure is always applied to one side or the other of a piston therein, thereby insuring that the lifting rack always goes to and stays at the end of its travel until air pressure on the piston is reversed.

A control circuit for the reciprocation of the lifting rack is schematically illustrated in FIG. 17. Compressed air from source 156 is supplied to air cylinder 480 via 4-way valve 484 and conduit 486. A signal from signal source 488 is supplied to 4-way valve 484 via mechanically operated contacts 492 in commercial timer 490. As noted hereinbefore, commercial timer 490 is driven from the shaft of continuously driven nip roll 266 via a gear reduction unit 494. In this embodiment the gear ratio selected for unit 494 is eight to one, so that contacts 492 are closed once after each eight machine cycles. On closure of contacts 492, the lifting rack is moved from a lower carrier receiving position to an upper position to transfer carriers on the lifting rack pawls to the upper stationary support pawls. After transfer of the carriers or articles being stacked, the contacts 492 are mechanically opened and the 4-way valve 484 reverses the connection of compressed air to the other side of the piston of air cylinder 480, which drives the lifting rack downwardly to and holds it in a lower carrier receiving position.

The stacking apparatus also includes an elevator plate 500 secured to support members 502 on a shaft 504 which is journaled in bearing blocks 506 depending from upper deck plate 332. The elevator plate 500 is disposed between parallel mounting blocks 412, 414 to successively receive carriers from the indexing mechanism.

The elevator plate 500 is pivotable on shaft 504 to lift a carrier thereon into engagement with the lifting rack pawls. Apertures 508, 510 and 512 are formed in the plate 500 to permit the bottom portions of the pairs of pawls 470, 472 and 474, respectively, to be received and passed by the plate 500 to insure that the bottom or lips 39 of a carrier 31 will reach the height of the catch surfaces of the pawls.

The plate is reciprocably pivoted between the carrier receiving position and the carrier transfer position by a link 514 pivotally connected to both a support member 502 and one end of a crank 516 secured to a shaft 518. Referring to FIG. 8, it can be seen that shaft 518 is journally supported in support members 184, 186 depending from upper deck plate 332. The forward end of shaft 518 has one end of a second crank 520 secured thereto. The other end of crank 520 is pivotally connected to one end of a link 522 which has its other end pivotally connected to one end of a lever 524. The other end of lever 524 is pivotally connected by suitable means to the frame of the machine. A cam follower 526 is mounted intermediate the ends of lever 524 and is held against the surface of a cam 528 by spring 530 connected between the end of link 522 and the frame or deck of the machine. The cam 528 is secured to the power shaft 116.

The cam 528 is positioned on shaft 116 so that after a carrier is indexed onto the elevator plate 500, the cam 528 pushes cam follower 526 downwardly, pulling link 522 and crank 520 to rotate shaft 518 in a clockwise direction. Crank 516 is then rotated in a clockwise direction pushing link 514 upwardly to pivot elevator plate 500 upwardly to lift a carrier into the lifting rack. The pivot point of plate 500 is located and the length of link 514 is selected so that when a carrier is engaged by the lifting rack pawls the elevator plate 500 will be inclined fifteen degrees with respect to the horizontal, and thus perpendicular or normal to the axis of the lifting rack and the guideway to insure even stacking and nesting of the carriers initially in the lifting rack.

After the transfer of a carrier from the elevator plate 500 to the lifting rack, the cam 528 allows cam follower 526 and link 522 to be pulled upwardly by spring 530. This reverses the mechanical motions described just above and the elevator plate 500 is lowered to receive the next carrier from the indexing mechanism.

The above constitutes an apparatus for stacking articles which includes an upright guideway for receiving a plurality of articles and maintaining them in a stacked relationship. Support means in the form of stationary pawls are disposed on the periphery of the guideway for engaging an article in the guideway to support that article, as well as other such articles stacked thereon. The pawl support means permit passage of articles upwardly past the support means through the guideway but prevent passage of articles downwardly past the support means.

A lifting rack is provided having article engaging means, such as pawls, disposed below the support means of the guideway and around the periphery of the guideway for lifting one or more articles from above an initial article receiving or entry position in the guideway to a level at which the lowermost article in the lifting rack is engaged by the stationary support means in the guideway. Articles previously engaged by the stationary support means are pushed upwardly in the guideway and combined with articles received from the lifting rack in a stack in the guideway.

Elevator means are provided for successively elevating articles from an entry or pre-stacking position into article engaging position in the lifting rack. This includes an elevator plate pivotably mounted to successively raise the articles.

The stationary support and article engaging pawl means advantageously have first surfaces beginning inside an area defined by the largest perimeter of the articles, in this instance the perimeter defined by lips 39 of carriers 31, and extending downwardly and outwardly to terminate outside of the perimeter, thereby guiding the articles into the stationary support and article engaging means. Further, second catch surfaces are formed integral with and above the first surfaces to engage the articles below the largest perimeter thereof. The first and second surfaces are preferably pivotably mounted to enable the surfaces to be pushed outwardly by a perimeter of an article moving upwardly. However, if the perimeter is sufficiently flexible, such as the lips 39, it would be possible to hold the stationary support and article engaging means relatively rigidly and let the perimeter or lips flex to pass upwardly to the catch surfaces.

The lifting rack is movable up the guideway in response to the receipt of a predetermined number of articles received in the rack, or on a periodic basis. The rack is then moved back down to an article receipt level.

The guideway may be constructed with an open side for easy removal of a stack of articles therefrom. The guideway is then advantageously tilted in a direction opposite to the open side thereof in order to insure that a stack of articles is retained in the guideway by gravity.

It is to be understood that the form of the invention herewith shown and described is to be taken as an illustrative embodiment only, and that various changes in the shape, size and arrangement of the parts or in the steps of the method may be made without departing from the spirit and scope of the invention.

I claim:

1. Apparatus for stacking articles, comprising;

(a) an upright guideway for receiving a plurality of articles and maintaining them in a stacked relationship, (b) support means disposed on the periphery of said guideway for engaging an article in said guideway to support said article as well as other such articles stacked thereon, said support means including means permitting passage of articles upwardly past said support means through said guideway but preventing passage of articles downwardly past said support means, (c) lifting rack means having article engaging means disposed below said support means on the periphery of said guideway for lifting a plurality of articles from above an initial entry position in said guideway to a level at which the lowermost article in said lifting rack means is engaged by said support means, articles previously engaged by said support means being pushed upwardly in said guideway and combined with articles received from said lifting rack means in a stack in said guideway, and (d) means for successively elevating articles into article engaging position in said lifting rack means until a plurality of such articles are stacked in said lifting rack means.

2. Apparatus as defined in claim 1 in which said support means includes means having a first surface beginning inside an area defined by the largest perimeter of an article and extending downwardly and outwardly to terminate outside of said perimeter, thereby guiding articles into said support means.

3. Apparatus as defined in claim 2 in which said support means further includes a second catch surface above said first surface to engage an article below the largest perimeter thereof.

4. Apparatus as defined in claim 3 in which said first and second surfaces are pivotably mounted enabling said surfaces to be pushed outwardly by a perimeter of an article moving up said guideway.

5. Apparatus as defined in claim 4 which further includes means for yieldingly urging said first and second surfaces toward a perimeter of an article.

6. Apparatus as defined in claim 1 in which said support means comprises pawl means mounted on said upright guideway.

7. Apparatus as defined in claim 1 in which said lifting rack means is movable up said guideway in response to the receipt of a predetermined number of articles in said rack means to deposit said articles on said support means.

8. Apparatus as defined in claim 1 in which said lifting rack is periodically reciprocable up to said support means to deposit thereon articles accumulated in said rack means, and back down to an article receipt level.

9. Apparatus as defined in claim 1 in which said lifting rack means includes pawl means to receive and engage articles from said elevating means.

10. Apparatus as defined in claim 1 in which said lifting rack means includes slide rod means secured to said guideway and bracket means slidably mounted on said slide rod means.

11. Apparatus as defined in claim 10 in which said lifting rack means further includes fluid cylinder means having a ram shaft operable to reciprocate said bracket means up and down said slide rod means.

12. Apparatus for stacking articles, comprising (a) an upright guideway for receiving a plurality of articles, and maintaining them in a stacked relationship, (b) support means disposed on the periphery of said guideway for engaging an article in said guideway to support said article as well as well as other such articles stacked thereon, said support means including means permitting passage of articles upwardly past said support means through said guideway but preventing passage of articles downwardly past said support means, (c) lifting rack means having article engaging means disposed below said support means on the periphery of said guideway for lifting one or more articles from above an initial entry position in said guideway to a level at which the lowermost article in said lifting rack means is engaged by said support means, articles previously engaged by said support means being pushed upwardly in said guideway and combined with articles received from said lifting rack means in a stack in said guideway, and (d) an elevator plate pivotably mounted to successively raise articles into article engaging position in said lifting rack means.

13. Apparatus for stacking articles, comprising (a) an upright guideway for receiving a plurality of articles and maintaining them in a stacked relationship, (b) support means disposed on the periphery of said guideway for engaging an article in said guideway to support said article as well as other such articles stacked thereon, said support means including means permitting passage of articles upwardly past said support means through said guideway but preventing passage of articles downwardly past said support means, (c) lifting rack means having article engaging means disposed below said support means on the periphery of said guideway for lifting one or more articles from above an initial entry position in said guideway to a level at which the lowermost article in said lifting rack means is engaged by said support means, articles previously engaged by said support means being pushed upwardly in said guideway and combined with articles received from said lifting rack means in a stack in said guideway, and (d) an elevator plate pivotably mounted to reciprocate between a horizontal articles receiving position and an article transfer position at said lifting rack means which is perpendicular to said guideway, (e) said guideway having an open side for removal of a stack of articles therefrom and being tilted in a direction opposite to the open side thereof in order to insure that a stack of articles will be retained within the guideway by gravity.

14. Apparatus for applying labels to and then stacking plastic carriers for holding a plurality of filled containers, wherein the carrier has a top panel and a skirt extending downwardly therefrom with at least one surface area for receiving a label, comprising;

(a) means for indexing a series of carriers into a lable applicaiton position and then into a pre-stacking position, (b) an upright guideway for receiving a plurality of such plastic carriers and maintaining them in a stacked relationship, (c) stationary pawl means disposed on the periphery of said guideway for engaging the bottom of a skirt of a carrier to support a carrier as well as all carriers stacked thereon, (d) lifting rack means having vertically movable pawl means for engaging the bottom of a skirt of a carrier, said movable pawl means being disposed below said stationary pawl means on the periphery of said guideway for lifting a plurality of carriers from above an initial entry level in said guideway to a level at which the lowermost carrier in said lifting rack means is engaged by said stationary pawl means, and (e) means for successively elevating carriers from said pre-stacking position into said lifting rack means until a plurality of such carriers are stacked in said lifting rack means.

15. Apparatus as defined in claim 14 in which said lifting rack means is movable up said guideway to deposit carriers therein on said stationary pawl means in response to receipt of a predetermined number of carriers in said rack means.

16. Apparatus as defined in claim 14 in which said lifting rack means is periodically reciprocable up to said stationary pawl means to deposit thereon carriers accumulated in said rack means, and back down to a carrier receipt position.

17. Apparatus as defined in claim 14 in which (a) said guideway has an open side for removal of a stack of carriers therefrom and is tilted in a direction opposite to said open side to retain a stack of carriers therein by gravity, and in which (b) said elevating means includes means for inclining each carrier to an angle which is perpendicular to said guideway and raising said carrier into said lifting rack means.

18. Apparatus for applying labels to and then stacking plastic carriers for holding a plurality of filled containers, wherein the carrier has a top panel and a skirt extending downwardly therefrom with at least one surface area area for receiving a label, comprising (a) means for indexing a series of carriers into a label application position and then into a pre-stacking position, (b) an upright guideway for receiving a plurality of plastic carriers and maintaining them in a stacked relationship, (c) stationary pawl means disposed on the periphery of the guideway for engaging the bottom of a skirt of a carrier to support said carrier as well as all carriers stacked thereon, (d) lifting rack means having vertically movable pawl means for engaging the bottom of a skirt of a carrier, said movable pawl means being disposed below said stationary pawl means on the periphery of said guideway for lifting one or more carriers from above an initial entry level in said guideway to a level at which the lowermost carrier in said lifting rack means is engaged by said stationary pawl means, (e) said guideway having an open side for removal of a stack of carriers therefrom and being tilted in a direction opposite to said open side to retain a stack of oarriers therein by gravity, and (f) an elevator plate pivotably mounted to reciprocate between said carrier pre-stacking position and an inclined carrier transfer position at said lifting rack means which is perpendicular to said guideway for successively elevating carriers from said pre-stacking position into said lifting rack means.

19. Apparatus as defined in claim 18 in which said elevator plate is reciprocated by means responsive to operation of said indexing means thereby insuring reciprocation only after completion of an indexing cycle.

20. A method for successively stacking articles in an upright guideway for receiving a plurality of such articles and maintaining them in a stacked relationship, comprising the steps of:

(a) successively moving articles into a pre-stacking position, (b) elevating a predetermined plurality of said articles from said pre-stacking position into a lifting rack, and (c) reciprocating said lifting rack upwardly to stack support means on said guideway to deposit said plurality of articles thereon on said stack support means in said guidway and to push previously deposited articles on said stack support means upwardly in said guideway and then back downwardly to the position for receiving elevated articles from said pre-stacking position.

21. A method as defined in claim 20 which further includes the steps of (a) providing an open side in said guideway to remove stacks of articles and tilting said guideway away from the open side thereof to retain articles therein by gravity, and (b) inclining each article at said pre-stacking position to an angle perpendicular to said guideway as part of said article elevating step.

* * * * *